Figure 1:
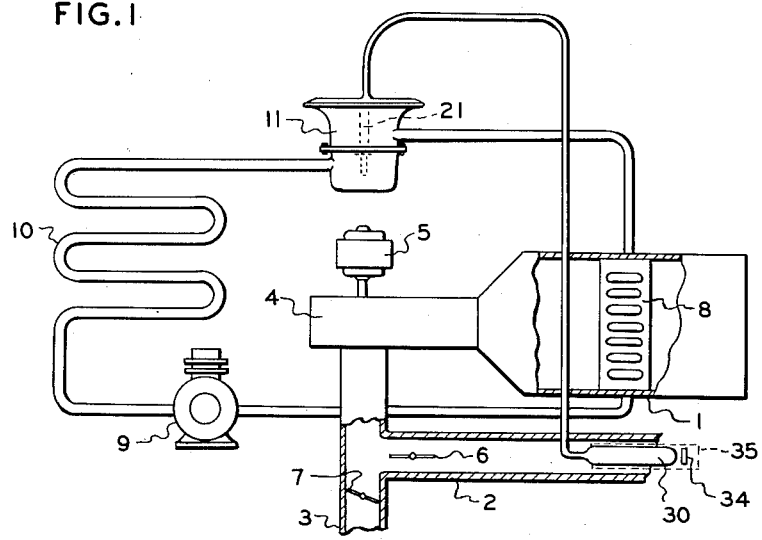

July 17, 1956 G. G. COYNE 2,754,661
AIR CONDITIONING APPARATUS
Filed April 19, 1954

INVENTOR.
GERARD G. COYNE
BY
HIS ATTORNEY

United States Patent Office 2,754,661
Patented July 17, 1956

2,754,661

AIR CONDITIONING APPARATUS

Gerard G. Coyne, Erie, Pa., assignor to General Electric Company, a corporation of New York Application April 19, 1954, Serial No. 423,943

8 Claims. (Cl. 62—6)

My invention relates to air conditioning apparatus and more particularly to refrigerating systems for use in such apparatus.

In various types of air conditioning apparatus, it is desirable that the refrigerating or cooling systems contained therein run more or less continuously. Specifically in room air conditioning units there are a number of factors which make continuous operation of the refrigerating system preferable to an intermittent cycling "on" and "off." Firstly, continuous operation of the refrigerating system tends to maintain a more uniform temperature throughout the conditioned room than is obtained when the unit is cycled "on" and "off." Continuous operation of the refrigerating system also avoids the objectionable light flicker which often accompanies the starting of the refrigerant compressor on standard household circuits. Further a continuous conditioning operation eliminates the "stuffiness" often incident to the "off" cycle of intermittently operating units.

Accordingly, it is a primary object of my invention to provide a new and improved refrigerating system adapted for continuous operation in air conditioning apparatus.

It is another object of my invention to provide a new and improved refrigerating system in which the output capacity is automatically modulated in response to a controlling condition of the medium being cooled.

A further object of my invention is to provide improved continuously operating, air conditioning apparatus in which the capacity of the cooling means is automatically modulated in response to the temperature of the conditioned enclosure to maintain an even temperature therein.

Another object of my invention is to provide improved air conditioning apparatus including a continuously operating, automatically modulated refrigerating system which may be manually adjusted to maintain the conditioned enclosure at any one of a range of different temperatures.

It is also an object of my invention to provide air conditioning apparatus having a novel refrigerating system whose capacity is automatically modulated in response to the temperature of the conditioned enclosure, which may be adjusted to hold different base temperatures in the conditioned enclosure, and which includes means preventing frosting of the cooling coils under normal operating conditions no matter what the modulating effect resulting from the enclosure temperature.

My invention also has as its object the provision of an improved air conditioner refrigerating system whose cooling capacity is automatically modulated by a novel adjustable expansion valve in response to the temperature of the conditioned enclosure, which valve includes stop means limiting the maximum restriction of the valve to maintain a sufficiently high refrigerant pressure and temperature in the evaporator to prevent frosting of the evaporator coils.

In carrying my invention into effect, I provide an air conditioning unit having a novel refrigerating system which includes a condensing unit, an adjustable expansion valve and an evaporator connected in a closed refrigerant circuit. The output capacity of this system is controlled by means of a movable element included in the expansion valve, which is operable to vary the restriction offered to refrigerant flow by the valve. The air conditioning unit also contains means for blowing an air stream over the evaporator and into the enclosure to be conditioned; and in accordance with my invention I modulate the capacity of the refrigerating system and thus the output temperature of the air stream in response to the temperature of the conditioned enclosure thereby to maintain an even temperature in the enclosure. Specifically I provide means responsive to the temperature of the conditioned enclosure which adjusts the movable element of the expansion valve so as to vary the refrigerant flow in the system in accordance with changes in the enclosure temperature from a predetermined base temperature. Additionally in my preferred embodiment means are also provided which limit the maximum restriction of the valve no matter what the deviation of the enclosure temperature from the desired base temperature. This maximum restriction insures that under normal operating conditions a sufficiently high evaporator temperature and pressure will be maintained to prevent frosting of the evaporator coils. Further in this preferred embodiment I also include means for modifying the response of the temperature sensing means. By modifying the response of the temperature sensing means different base temperatures of the enclosure may be selected for controlling the capacity modulation of the system. In other words, the system may be set so that different base temperatures will be maintained in the conditioned enclosure.

Figure 2:
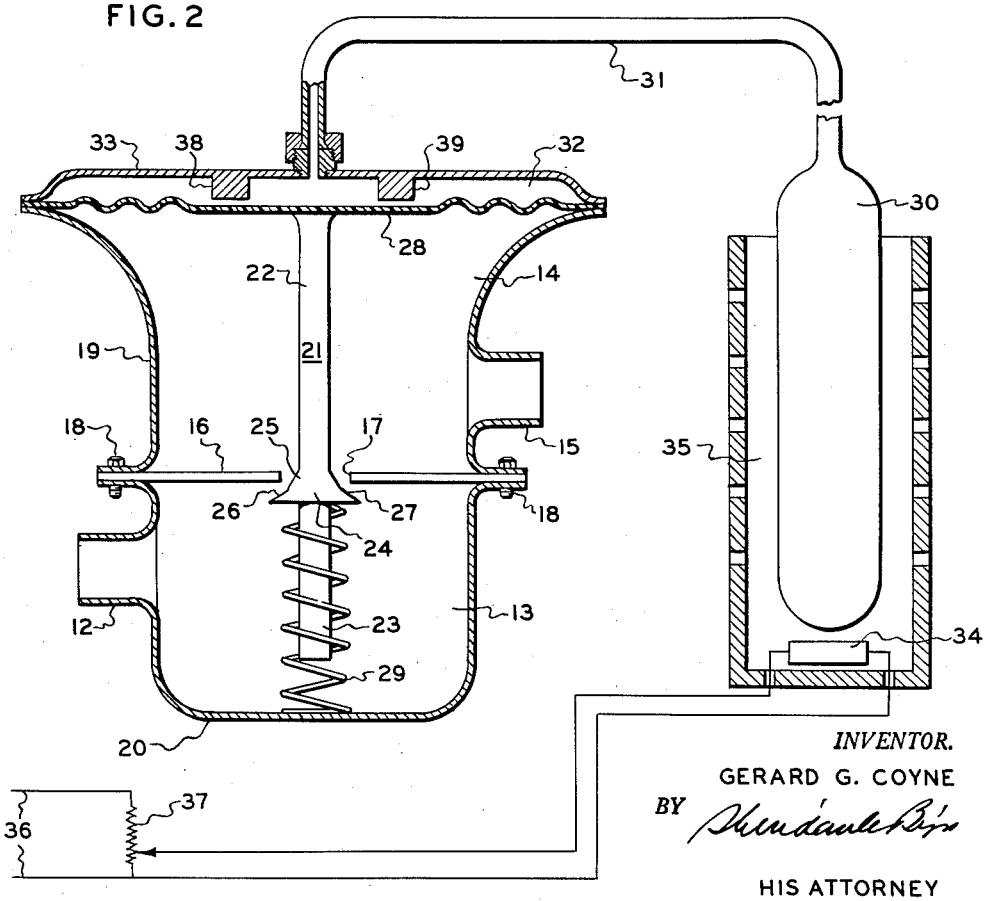

The novel features which I believe to be characteristic in my invention are set forth with particularity in the appended claims. My invention itself, however, both as to its organization and method of operation, may be best understood by reference to the following description taken in conjunction with the accompanying drawing in which:

Fig. 1 is a schematic illustration of an air conditioning unit embodying my invention; and Fig. 2 is a detailed showing of the capacity modulating means included in the air conditioning unit of Fig. 1.

Referring now to Fig. 1, I have shown therein air conditioning apparatus having a discharge duct 1 leading to the room or other enclosure to be conditioned. The air to be conditioned may be drawn into the apparatus either through an inlet duct 2 leading from the room or an inlet duct 3 leading from the outside atmosphere. A centrifugal blower 4 or other air moving means driven by an electric motor 5 serves to draw air inwardly through the ducts 2 and 3 and discharge it outwardly through the duct 1. In order to control the ratio of room air recirculated through the apparatus to fresh air admitted thereto, movable dampers 6 and 7 are provided respectively in the inlet ducts 2 and 3. By the movement of these dampers the amounts of recirculated room air and outside fresh air entering the apparatus may be controlled so as to obtain the desired conditioning effect. In their positions illustrated damper 6 is fully open to allow the greatest possible recirculation of room air while the damper 7 is closed to prevent any flow whatsoever of fresh air.

In order to condition the air flowing through the apparatus, I have provided a novel refrigerating system which includes a heat exchanger or evaporator 8 positioned in the discharge duct 1. The air leaving the blower 4 flows over and around the tubing passes of the evaporator 8 and is cooled thereby prior to its discharge into the room. Besides the evaporator 8 the refrigerating system includes a condensing unit comprising a compressor 9 and a condenser 10, and a refrigerant expansion means comprising an adjustable expansion valve 11.

More specifically, compressor 9, condenser 10, adjustable valve 11, and evaporator 8 are connected in a closed refrigerant circuit.

In accordance with my invention, the compressor 9 runs continuously when the air conditioning apparatus is in operation and the expansion valve 11 is automatically adjusted to provide a suitable refrigerating effect for maintaining an even temperature within the conditioned room. In other words, according to my invention the valve 11 provides a capacity modulating means whereby a desired temperature may be maintained within the room.

The features and the operation of the valve 11, which form very important aspects of my invention, may be better understood by reference to Fig. 2. As may there be seen, the inlet 12 leading from the condenser 10 empties into a chamber 13 in the lower part of the valve. Above the inlet chamber 13 is positioned an outlet chamber 14 from which an outlet tube 15 leads to the evaporator 8. The two chambers 13 and 14 are separated from each other by a flat member or plate 16 which contains an orifice 17. The plate 16 may be held in place by any suitable means and here, for example, is positioned by means of a plurality of screws 18 which additionally secure together upper and lower members 19 and 20 of the valve casing.

In order to provide an adjustable restriction for modifying the capacity of the refrigeration system, I have included in the valve 11 a movable valve member 21 which extends through the orifice 17. The movable member 21 includes upper and lower cylindrical stems 22 and 23 and intermediate these stem portions it is provided with a valve element or flange 24 adapted to cooperate with orifice 17 to vary the restriction offered by the valve. The shape of this valve element 24 may be varied according to the use of the system to obtain the desired flow characteristics. But in my preferred embodiment the valve element 24 is divided into upper and lower frustoconical sections 25 and 26, the upper section 25 being more steeply sloped and running between the cylindrical stem 21 and the less steeply sloped section 26. The radius 27 at which the upper section 25 joins the lower section 26 is somewhat smaller than the radius of the orifice 17 so that the section 26 as well as the section 25 may be used to vary the restriction offered by orifice 17. In other words both sloped valve sections 25 and 26 are cooperable with orifice 17 to vary the valve restriction and thereby the flow of refrigerant through the system. As will be more fully explained hereinafter the more steeply sloped section 25 provides a fine adjustment of the refrigerant flow for running the evaporator full with zero degrees super heat or any other condition to give the desired maximum system performance. By running the evaporator full, I mean supplying the evaporator with the particular amount of refrigerant which will result in all the refrigerant being boiled off but not being superheated by the time it leaves the evaporator. The less steeply sloped section 26, on the other hand, provides a coarse adjustment for making a considerable variation in the flow to give a reduction in capacity once the system has pulled the enclosure down to the desired base temperature.

From the diagram it may be seen that the position of valve element 24 relative to orifice 17 may be adjusted by moving the valve member 21 vertically up and down. In accordance with my invention means are provided whereby this valve adjustment is effected automatically so that the capacity of the refrigeration system is modulated in accordance with the temperature of the conditioned enclosure or more specifically in accordance with the temperature of the air stream flowing from the enclosure. To accomplish this result the valve member 21 is attached at the top of its upper stem 22 to an actuating means, for example the movable diaphragm 28, and around its lower stem 23 there is positioned a coil spring 29. The coil spring biases the valve member and the diaphragm upwardly so as to tend to close the valve, i. e. force valve element 24 into orifice 17, and the actuating means supplies a force opposing the spring and effective to cause automatic adjustment of the valve. Specifically, in the illustrated embodiment this adjusting force is supplied by means of liquid pressure on the diaphragm 28.

As shown in Fig. 1 this liquid pressure is controlled by a temperature sensing element 30 mounted in the room air duct 2. This temperature sensing element in its preferred form comprises a liquid filled bulb which is connected by means of a tube 31 to a chamber 32 lying between the diaphragm 28 and the top casing member 33 of valve 11. The tube 31 and the chamber 32 are also filled with liquid so that any change in temperature of the air surrounding the bulb 30 tending to cause an expansion or contraction of the liquid in bulb 30 results in the pressure on diaphragm 28 being either increased or decreased so as to cause movement of the diaphragm. In other words, a change in the temperature of the air stream flowing past bulb 30 causes a movement of diaphragm 28 and thus a movement of the valve member 21. Since the movement of valve member 21 changes the restriction offered to refrigerant flow within the refrigeration system, this thus results in modulation of the capacity of the refrigeration system in response to the temperature of the air stream flowing past bulb 30.

In my preferred air conditioning unit the feeler bulb 30 is positioned in duct 2 so that the room air stream flows over it prior to contacting the evaporator 8. In other words, the bulb 30 detects the temperature of the room air and effects a modulation of the refrigeration system so that the temperature of the output air flowing into the enclosure through duct 1 is varied to maintain the room at some predetermined base temperature. Referring to Fig. 2 it can be seen that if the room air temperature increases above the base temperature, such will cause an expansion of the liquid within bulb 30 resulting in a downward movement of the diaphragm 28 and the valve member 21. The downward movement of the movable valve member will cause less restriction to be offered to the flow of refrigerant through the expansion valve, and therefore, more refrigerant will flow throughout the system and the output air stream in duct 1 will be colder. Conversely, if the temperature of the incoming room air should drop below the base temperature, the valve member will move upwardly to increase the restriction and decrease the refrigerant flow thereby causing an increase in the output air temperature.

The fine control of the refrigerant flow affected by the steeply sloped section 25 provides a flow schedule which runs the evaporator full so long as the room air is above the desired base temperature. The amount of refrigerant required to run the evaporator full decreases slightly as the air temperature drops because of the decreased temperature differential between the evaporator and the air. But the slight progressively increasing restriction offered by valve section 25 causes such a decrease in the refrigerant flow that the evaporator is still run full but not flooded through as the air temperature drops. As is well known in the art, this condition provides the maximum cooling which the system can produce and thus causes the most rapid reduction possible of the room air temperature toward the desired base temperature. Of course, if the full evaporator flow rate is for some reason not desired, the valve section 25 may be shaped to give any other desired flow characteristic.

When, however, the room temperature approaches the desired base temperature, the less steeply sloped section 26 enters the orifice 17 and substantially restricts the refrigerant flow. This reduction in the flow reduces the cooling capacity of the evaporator so that the room temperature does not drop any appreciable amount below the desired base temperature. Thereafter, any change in temperature of the incoming air either up or down will result in a movement of the valve member so as to correct for that change and maintain the predetermined base temperature of the room air. This effect will occur whether all room air is being recirculated through the air conditioning apparatus or whether a mixture of fresh and room air is being conditioned. In either case the capacity of the refrigerating system is automatically modulated to maintain the same base temperature within the room no matter what the temperature of the incoming air. Of course, there is a maximum capacity of the system, which will occur when the valve stem 22 moves downwardly into orifice 17. This maximum capacity is, however, rarely needed except when the unit is starting up to bring down the temperature of a very warm room.

As thus far described, the capacity of my new and improved air conditioning apparatus will be automatically modulated to maintain one predetermined base temperature within the room. However, in accordance with my invention I have provided in this apparatus manually operable means whereby any base temperature may be selected over a rather wide range thereof. Thus to accomplish this result in my preferred embodiment I have provided an electric heater 34 within the perforated casing 35 surrounding the temperature sensing element 30. The heater 34 is energized from a power source 36 through a rheostat 37 which may be manually operated or adjusted so as to vary the energization of heater 34. In other words, the rheostat 37 allows the user of the air conditioning apparatus to cause heater 34 to produce more or less heat.

When heater 34 is energized, heat is, of course, applied to the bulb 30, the amount of such heat depending on the amount of power supplied to the heater. This heat causes a warming of the temperature sensing element and an expansion of the liquid contained therein. In other words, the heater "fools" the temperature sensing element and makes it "think" that the air stream in duct 2 is warmer than it actually is. The result of this is that the temperature sensing element will tend to open the valve 11 more than it would otherwise do. The more power applied to the heater, the greater will be the refrigerating effect applied to evaporator 8, and the lower will be the temperature of the air leaving duct 1.

By adjusting the amount of power supplied to the heater, the capacity of the refrigeration system may be changed to maintain different temperatures in the conditioned enclosure. For any given energization of the heater a particular base temperature of the conditioned air will be the result. In other words, the effect of the heater is to allow the setting of different base temperatures which will then be maintained by modulation of the unit. No matter what the heater setting, the system will still modulate. Once the desired temperature is reached, the capacity of the system will be automatically modulated so as to maintain that temperature just as would occur in the system if there were no heater at all. In other words the heater allows the selection of different base or mean temperatures without appreciably affecting the modulating capacity feature of the system at all.

As mentioned above, as the valve is opened wider from any particular setting, more refrigerant flows therethrough so as to increase the capacity of the system. Conversely as the valve closes, less refrigerant flows so as to decrease the capacity of the system. However, as the valve closes and the restriction offered by the valve increases, the temperature of what refrigerant does flow is lower than when less restriction is offered. As is well known in the art, the result of more restriction is to lower the pressure on the lower side of the valve, which of course causes a lower temperature of the refrigerant. In other words, although the refrigerant flow is so greatly reduced as the valve closes that the capacity of the system is lessened, nonetheless what refrigerant does get thorough the orifice 17 is much colder than when a large amount is flowing. In fact, if the valve member 21 were allowed to close too far, the refrigerant flowing out of the valve would become so cold that frosting of the first few turns or coils of the evaporator would result. There would be so little refrigerant flowing that the refrigerant would evaporate and warm up very quickly and thus provide less refrigerating effect over the whole evaporator than when a larger amount of warmer refrigerant is flowing; but nonetheless the small amount of very cold refrigerant would cause frosting of the very first few turns of the evaporator.

Therefore, in accordance with my invention I have provided within the valve 11 stop means which limit the closing of the valve beyond a predetermined position of maximum restriction. In other words, because of this means the valve cannot close to a point where frosting of the first few coils would result. The valve can close only to a point where the temperature of the refrigerant entering the coils will still be high enough that frosting cannot occur on the evaporator. In my preferred embodiment this stop means comprises the protuberances 38 and 39 attached to the top member 33 of the valve casing. Once the diaphragm contacts these members 38 and 39 it can move no further toward the casing and thus cannot close the valve any further. In other words the stops 38 and 39 limit the closing travel of the valve to a predetermined maximum restriction. When the diaphragm 28 contacts these protuberances, the valve is still open far enough that frosting of the refrigerator coils will not result.

From a consideration of the above it will be seen that I have provided an improved air conditioning unit containing a continuously operating refrigeration system whose capacity is automatically modulated to maintain an even temperature within the room. The output of the system may be simply and easily adjusted so that any predetermined base temperature may be held within the room. Further, the means causing the capacity modulating are such that frosting of the evaporator coils cannot result under normal operating conditions no matter what demand is made on this system. However, it should be understood that the refrigerating system of my invention is not necessarily limited to use in air conditioning. It could be used in any application where it is desired to modulate the operation of a refrigeration system between full and lesser capacity in response to some predetermined condition.

Thus while in accordance with the Patent Statutes I have described what at present is considered to be the preferred embodiment of my invention, it will be obvious to those skilled in the art that various changes and modifications may be made therein without departing from my invention, and I therefore aim in the appended claims to cover all such changes and modifications as fall within the true spirit and scope of my invention.

What I claim as new and desire to secure by Letters Patent of the United States is:

1. Refrigerating apparatus comprising a condensing unit, an evaporator, means including an adjustable expansion valve connecting said condensing unit and said evaporator in a closed refrigerant system, said adjustable expansion valve being operable to vary the restriction offered to refrigerant flow by said valve, means for blowing an air stream over said evaporator, and means responsive to the temperature of said air stream for adjusting said valve to vary the refrigerant flow in said system in accordance with changes in said temperature thereby to modulate the capacity of said system and control the cooling effect applied to said air stream, said valve including a fixed orifice and a valve element having a pair of adjacent frusto-conical sections cooperating with said orifice to vary the restriction of said valve, said sections being sloped at different angles for providing a fine adjustment of the refrigerant flow during the original reduction in the enclosure temperature and a coarse adjustment of the refrigerant flow thereafter for temperature control.

2. Apparatus for conditioning an enclosure comprising a condensing unit, an evaporator, means including an adjustable expansion valve connecting said condensing unit and said evaporator in a closed refrigerant system, said adjustable expansion valve being operable to vary the restriction offered to refrigerant flow by said valve, means for blowing an air stream over said evaporator and into said enclosure, a temperature sensing element for sensing the temperature of said enclosure, means controlled by said temperature sensing element for adjusting said valve to vary the refrigerant flow in said system in response to variations in the temperature of said enclosure from a base temperature thereof thereby to modulate the capacity of said system and the output temperature of said air stream to maintain said base temperature in said enclosure, said valve including a fixed orifice and a valve element having a pair of adjacent frusto-conical sections cooperating with said orifice to vary the restriction of said valve, said sections being sloped at different angles for providing a fine adjustment of the refrigerant flow during the original reduction in the enclosure temperature to said base temperature and a coarse adjustment of the refrigerator flow thereafter upon departures of said enclosure temperature from said base temperature, and manually operable means for modifying the response of said temperature sensing element thereby to allow the selection of different base temperatures of said enclosure for controlling the capacity modulation of said system.

3. Apparatus for conditioning an enclosure comprising a condensing unit, an evaporator, means including an adjustable expansion valve connecting said condensing unit and said evaporator in a closed refrigerant system, said adjustable expansion valve being operable to vary the restruction offered to refrigerant flow by said valve, means for blowing an air stream over said evaporator and into said enclosure, a temperature sensing element for sensing the temperature in said enclosure, means controlled by said temperature sensing element for adjusting said valve to vary the refrigerant flow in said system in response to variations in the temperature of said enclosure from a base temperature thereof thereby to modulate the capacity of said system and the output temperature of said air stream to maintain said base temperature in said enclosure, said valve including a fixed orifice and a valve element having a pair of adjacent frusto-conical sections cooperating with said orifice to vary the restriction of said valve, said sections being sloped at different angles for providing a fine adjustment of the refrigerant flow during the original reduction in the enclosure temperature to said base temperature and a coarse adjustment of the refrigerant flow thereafter upon departures of said enclosure temperature from said base temperature, an electric heater positioned adjacent said temperature sensing element for modifying the response of said element, and manually operable means for varying the energization of said heater thereby to select different base temperatures of said enclosure for controlling the capacity modulation of said system.

4. Apparatus for conditioning an enclosure comprising a condensing unit, an evaporator, means including an adjustable expansion valve connecting said condensing unit and said evaporator in a closed refrigerant system, said adjustable expansion valve having a movable element operable to vary the restriction offered to refrigerant flow by said valve, means for blowing an air stream over said evaporator and into said enclosure, means responsive to a condition of said enclosure for adjusting said valve to vary the refrigerant flow in said system in accordance with changes in said condition thereby to modulate the capacity of said system and the output condition of said air stream, and stop means limiting the closing of said valve beyond a predetermined position of maximum restriction thereby to maintain a sufficiently high refrigerant pressure and temperature in said evaporator to prevent frosting on said evaporator.

5. Refrigerating apparatus comprising a condensing unit, an evaporator, means including an adjustable expansion valve connecting said condensing unit and said evaporator in a closed refrigerant system, said adjustable expansion valve having a movable element operable to vary the restriction offered to refrigerant flow by said valve, means for blowing an air stream over said evaporator, means responsive to the temperature of said air stream for adjusting said valve to vary the refrigerant flow in said system in accordance with changes in said temperature thereby to modulate the capacity of said system and control the cooling effect applied to said air stream, and stop means limiting the closing of said valve beyond a predetermined position of maximum restriction thereby to maintain a sufficiently high refrigerant pressure and temperature in said evaporator to prevent frosting on said evaporator.

6. Apparatus for conditioning an enclosure comprising a condensing unit, an evaporator, means including an adjustable expansion valve connecting said condensing unit and said evaporator in a closed refrigerant system, said adjustable expansion valve having a movable element operable to vary the restriction offered to refrigerant flow by said valve, means for blowing an air stream over said evaporator and into said enclosure, a temperature sensing element for sensing the temperature of said enclosure, means controlled by said temperature sensing element for adjusting said valve to vary the refrigerant flow in said system in response to variations in the temperature of said enclosure from a base temperature thereof thereby to modulate the capacity of said system and the output temperature of said air stream to maintain said base temperature in said enclosure, manually operable means for modifying the response of said temperature sensing element thereby to allow the selection of different base temperatures of said enclosure for controlling the capacity modulation of said system, and stop means limiting the closing of said valve beyond a predetermined position of maximum restriction thereby to maintain a sufficiently high refrigerant pressure and temperature in said evaporator to prevent frosting on said evaporator.

7. Apparatus for conditioning an enclosure comprising a condensing unit, an evaporator, means including an adjustable expansion valve connecting said condensing unit and said evaporator in a closed refrigerant system, said adjustable expansion valve having a movable element operable to vary the restriction offered to refrigerant flow by said valve, means for blowing an air stream over said evaporator and into said enclosure, a temperature sensing element for sensing the temperature of said enclosure, means controlled by said temperature sensing element for adjusting said valve to vary the refrigerant flow in said system in response to variations in the temperature of said enclosure from a base temperature thereof thereby to modulate the capacity of said system and the output temperature of said air stream to maintain said base temperature in said enclosure, an electric heater positioned adjacent said temperature sensing element for modifying the response of said element, manually operable means for varying the energization of said heater thereby to select different base temperatures of said enclosure for controlling the capacity modulation of said refrigerating system, and stop means limiting the closing of said valve beyond a predetermined position of maximum restriction thereby to maintain a sufficiently high refrigerant pressure and temperature in said evaporator to prevent frosting on said evaporator.

8. Apparatus for conditioning a room comprising a condensing unit, an evaporator, means including an adjustable expansion valve connecting said condensing unit and said evaporator in a closed refrigeration system, means for circulating a stream of room air over said evaporator, a temperature sensing hydraulic bulb positioned in said air stream prior to its passing over said evaporator, pressure responsive means controlled by said temperature sensing bulb for adjusting said valve to vary the refrigerant flow in said system in accordance with changes in the temperature of said air stream thereby to modulate the capacity of said system and the output temperature of said air stream to maintain a predetermined even temperature in said room, manually operable means for modifying the response of said temperature sensing bulb thereby to allow selection of different predetermined temperatures to be maintained in said conditioned air by the capacity modulation of said refrigerant system, and stop means limiting the closing of said valve beyond a predetermined position of maximum restriction thereby to maintain a sufficiently high refrigerant pressure and temperature in said evaporator to prevent frosting of said evaporator.

References Cited in the file of this patent

UNITED STATES PATENTS

| | | |
|---|---|---|
| 2,203,560 | Ashley | June 4, 1940 |
| 2,221,062 | Starr | Nov. 12, 1940 |
| 2,296,680 | McLenegan | Sept. 22, 1942 |
| 2,319,005 | Lum | May 11, 1943 |